Patented Mar. 23, 1937

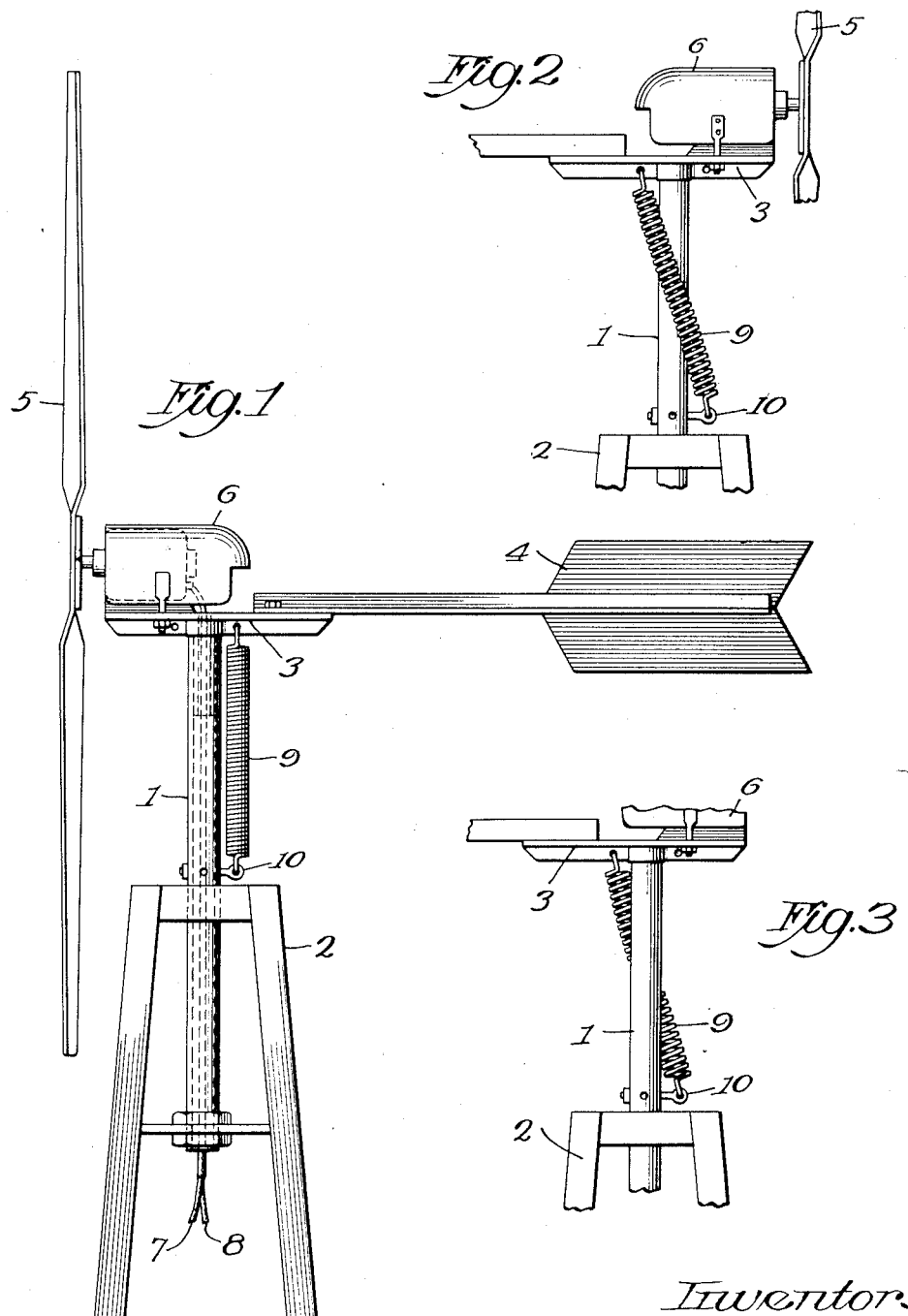

2,074,952

UNITED STATES PATENT OFFICE 2,074,952

SAFETY DEVICE FOR WIND DRIVEN GENERATORS

John R. Albers and Gerhard H. Albers, Sioux City, Iowa, assignors to Wincharger Corporation, Sioux City, Iowa, a corporation of Minnesota Application May 15, 1935, Serial No. 21,526

6 Claims. (Cl. 170—41)

This invention relates to wind driven generators of the windmill type, in which an electric current generator is mounted as a unit to turn with the horizontal rotation of the windmill upon its vertical pivotal support, and more particularly concerns the provision of simple, inexpensive, and efficient means to prevent the electric wires connected with the generator unit from being twisted loose or broken.

In devices of the character and purpose here involved, it is highly desirable to avoid the use of collector-rings and other forms of movable surface contacts in the electric circuit, and it is the principal object of this invention to permit the employment of continuous wire connections firmly attached to the generator unit and to provide against their being twisted loose, broken, or damaged by the aforesaid horizontal rotation of the windmill upon its vertical pivotal support.

In the drawing, Figure 1 is a view, in side elevation, of the upper portion of a wind driven generator, showing the preferred application of our invention thereto; and Figs. 2 and 3 are broken detail views, also in side elevation, of some of the parts shown in Fig. 1, illustrating different positions thereof and the operative action of our invention thereupon.

Tubular pivotal support 1 is secured firmly, in any desired manner, to the upper part of tower 2, and projects a substantial distance thereabove. Turntable 3 is pivotally supported to turn horizontally upon the upper end of support 1 and in turn supports the usual vane 4 and wind-wheel 5.

An electric current generator (not shown) is secured upon turntable 3 within the housing 6. In the smaller types of devices, such as here illustrated, the rotor shaft of the generator-unit may be made long enough to extend outwardly from housing 6 and carry wind-wheel 5. In such a direct-drive arrangement, transmission gearing is not employed and the rotor-shaft-bearings of the generator-unit constitute the bearings for the wind-wheel-shaft. The upper ends of wires 7 and 8 are firmly secured to their proper respective terminals on the generator-unit, and the wires may be passed down within the tubular support 1.

Unless prevented, the veering or backing of the wind will eventually effect the rotation of turntable 3 in one direction or the other a sufficient number of turns to twist the wires 7 and 8 about each other and wrench them loose from their connections with the terminals on the generator-unit, break them, wear the insulation therefrom, or otherwise destroy their efficiency as electric current conductors. The simple means we have provided is designed to elastically resist and prevent the rotation of turntable 3 further than may be desired in either direction and at the same time exert a constantly active influence to return it to its original position. This is distinctly an advantage over the use of a positive stop, where both the gradually increasing displacement resistance and the constant retrieving action would be absent.

As here shown, the preferred embodiment of the invention consists of a contractile coil spring 9, anchored at one end to an eyebolt 10 passed through pivotal support 1, and at the other end to the under side of turntable 3. In assembling or adjusting the apparatus, the pivotal support 1 should be placed so that the spring 9, when in its vertical or "zero" position (shown in Fig. 1), is to leeward of the generally prevalent winds of the particular locality. The wind-wheel 5 will thus be influenced by the spring to normally face the direction of the generally prevailing winds and, when the wind blows from a different quarter, the vane 4 will be acted upon thereby in the usual way to swing the wind-wheel to face the wind, turning the turntable 3 and carrying the upper end of spring 9 partially around pivotal support 1, and stretching the spring in so doing. Preferably, the length and strength of the spring is such as to strongly resist the rotation of the turntable more than one complete turn, but these details may be varied to a considerable extent without departing from the spirit and scope of our invention, depending somewhat upon the generally prevailing wind and weather conditions of the locality, and upon the sheltered or exposed location of the apparatus.

We claim—

1. The combination, in a wind-driven apparatus of the character described, of a member pivotally mounted for horizontal rotation, a wind-wheel, a horizontal wind-wheel-shaft, and a vane all mounted upon and rotatable with said member, said vane being so arranged with respect to said wind-wheel that the action of the wind upon said vane will tend to keep said wind-wheel in position to face the wind, and means acting upon said member to resist its rotation in either direction from a predetermined position.

2. The combination, in a wind-driven apparatus of the character described, of a member pivotally mounted for horizontal rotation, a wind-wheel, a horizontal wind-wheel-shaft, and a vane all mounted upon and rotatable with said member, said vane being so arranged with respect to said wind-wheel that the action of the wind upon said vane will tend to keep said wind-wheel in position to face the wind, and means acting upon said member to increasingly resist its rotative movement as said movement progresses in either direction from a predetermined position.

3. The combination, in a wind-driven apparatus of the character described, of a member pivotally mounted for horizontal rotation, a wind-wheel, a horizontal wind-wheel-shaft, and a vane all mounted upon and rotatable with said member, said vane being so arranged with respect to said wind-wheel that the action of the wind upon said vane will tend to keep said wind-wheel in position to face the wind, and elastic means acting upon said member to resist its rotation in either direction from a predetermined position.

4. The combination, in a wind-driven apparatus of the character described, of a fixed vertical support, a member pivotally mounted upon said support for horizontal rotation, a wind-wheel, a horizontal wind-wheel-shaft, and a vane all mounted upon and rotatable with said member, said vane being so arranged with respect to said wind-wheel that the action of the wind upon said vane will tend to keep said wind-wheel in position to face the wind, and spring means attached to said support and to said member and so arranged that the rotation of said member in either direction from a predetermined position will be elastically resisted by said spring.

5. The combination, in a wind-driven apparatus of the character described, of a fixed vertical support, a member pivotally mounted upon said support for horizontal rotation, a wind-wheel, a horizontal wind-wheel-shaft, and a vane all mounted upon and rotatable with said member, said vane being so arranged with respect to said wind-wheel that the action of the wind upon said vane will tend to keep said wind-wheel in position to face the wind, and a spring attached to said support and to said member and so arranged that the rotation of said member in either direction from a predetermined position will stress said spring and twist it about said support.

6. The combination, in a wind-driven apparatus of the character described, of a fixed vertical support, a member pivotally mounted upon said support for horizontal rotation, a wind-wheel, a horizontal wind-wheel-shaft, and a vane all mounted upon and rotatable with said member, said vane being so arranged with respect to said wind-wheel that the action of the wind upon said vane will tend to keep said wind-wheel in position to face the wind, and a contractile coil spring attached at one end to said support and at the other end to said member and so arranged that the rotation of said member in either direction from a predetermined position will expand said spring and bend it around said support.

JOHN R. ALBERS.
GERHARD H. ALBERS.